US012051857B2

(12) United States Patent
Kim et al.

(10) Patent No.: US 12,051,857 B2
(45) Date of Patent: Jul. 30, 2024

(54) HIGH FREQUENCY SYSTEM USING A CIRCULAR ARRAY

(71) Applicant: The MITRE Corporation, McLean, VA (US)

(72) Inventors: Jerry T. W. Kim, Fairfax, VA (US); Behrooz Fakhari, North Potomac, MD (US)

(73) Assignee: The MITRE Corporation, McLean, VA (US)

( * ) Notice: Subject to any disclaimer, the term of this patent is extended or adjusted under 35 U.S.C. 154(b) by 442 days.

(21) Appl. No.: 17/532,342

(22) Filed: Nov. 22, 2021

(65) Prior Publication Data

US 2022/0085519 A1 Mar. 17, 2022

Related U.S. Application Data

(62) Division of application No. 16/428,327, filed on May 31, 2019, now Pat. No. 11,183,774.

(51) Int. Cl.

*H01Q 21/20* (2006.01)
*H01Q 3/28* (2006.01)
*H01Q 21/26* (2006.01)
*H01Q 21/29* (2006.01)

(52) U.S. Cl.

CPC ............... *H01Q 21/20* (2013.01); *H01Q 3/28* (2013.01); *H01Q 21/26* (2013.01); *H01Q 21/293* (2013.01)

(58) Field of Classification Search

None

See application file for complete search history.

(56) References Cited

U.S. PATENT DOCUMENTS 2,217,623 A 10/1940 Peterson
6,028,558 A 2/2000 Van
6,255,998 B1 * 7/2001 Podger .................. H01Q 11/12 343/742
6,323,823 B1 11/2001 Wong et al.
6,870,508 B1 3/2005 Rivera (Continued)

FOREIGN PATENT DOCUMENTS

CN 202817195 U 3/2013
CN 102544762 B 3/2014

(Continued)

OTHER PUBLICATIONS

Gunashekar et al. (Aug. 2009). "Utilization of antenna arrays in HF systems," Annals of Geophysics 52(3): pp. 323-338.

(Continued)

*Primary Examiner* — Crystal L Hammond

(74) *Attorney, Agent, or Firm* — Morrison & Foerster LLP

(57) ABSTRACT

A transportable, resilient, high frequency system with a compact footprint is provided. The system may include a plurality of antenna elements arranged around a circle. A circular array provides a resilient radiation pattern that does not change based on the number of antennas in the array and is tolerant of errors in antenna placement. The gain of the system may be increased by increasing the number of antenna elements in the array to compensate for reduced efficiency of antenna elements having a radiating element with a length of less than half the wavelength of an operating frequency of the array.

9 Claims, 14 Drawing Sheets

(56) References Cited

U.S. PATENT DOCUMENTS

| | | | | |
|---|---|---|---|---|
| 7,567,213 | B2 | 7/2009 | Liu | |
| 9,794,903 | B2 | 10/2017 | Smith et al. | |
| 9,882,691 | B2 | 1/2018 | Kang et al. | |
| 2005/0007276 | A1 * | 1/2005 | Barrick | H01Q 21/205 342/383 |
| 2006/0001575 | A1 | 1/2006 | Jo et al. | |
| 2012/0062437 | A1 | 3/2012 | Hung | |
| 2013/0187821 | A1 | 7/2013 | Lecam et al. | |
| 2015/0364832 | A1 | 12/2015 | Karlsson | |
| 2015/0372397 | A1 | 12/2015 | Jonsson | |

FOREIGN PATENT DOCUMENTS

| | | |
|---|---|---|
| CN | 102904015 B | 9/2014 |
| CN | 104316925 A | 2/2017 |

OTHER PUBLICATIONS

Kim et al., U.S. Office Action dated Nov. 12, 2020 directed to U.S. Appl. No. 16/428,327; 9 pages.

Liu et al. (Oct. 2015). "HF-MIMO Antenna Array Design and Optimization," Thesis for Doctor of Philosophy: 192 pages.

* cited by examiner

HIGH FREQUENCY SYSTEM USING A CIRCULAR ARRAY

CROSS-REFERENCE TO RELATED APPLICATIONS

This application is a divisional of U.S. application Ser. No. 16/428,327, filed May 31, 2019, the entire contents of which are incorporated herein by reference.

STATEMENT REGARDING FEDERALLY SPONSORED RESEARCH OR DEVELOPMENT

This invention was made with Government support under U.S. Government contract W56KGU-16-C-0010 awarded by the Office of the Under Secretary of Defense for Acquisition & Sustainment (OUSD A&S). The Government has certain rights in this invention.

FIELD OF THE DISCLOSURE

The present disclosure relates generally to antennas and, more specifically, to high frequency systems.

BACKGROUND OF THE DISCLOSURE

High frequency (HF) communication systems provide an alternative to satellite communications in Beyond Line of Sight (BLOS) communications. Current long-range HF systems typically require multiple-element transmit and receive antenna arrays and are typically spread over several square kilometers. Due to their large footprint, they are easily identified and difficult to relocate.

SUMMARY OF THE DISCLOSURE

As explained above, current high frequency (HF) communication and radar detection systems often require multiple-element transmit and receive arrays. The arrays are typically spread over a large area and the individual antenna elements are often large in order to maintain efficiency at relevant operating frequencies, for example between 3 MHz and 30 MHz. The large size of these arrays and their constituent antenna elements pose problems in certain applications. The arrays are often difficult to relocate due to the large size of the antenna elements and the large distance over which they are placed. Additionally, the large arrays are easily detected and identified, such as by overhead surveillance. Thus, there is a need for a high frequency system that maintains high performance, reduces the size of the system and antenna elements, and is easily transportable.

A transportable, resilient high frequency system with a compact footprint is provided. The system may include a plurality of antenna elements arranged around a circle. A circular array provides a resilient radiation pattern that does not change based on the number of antennas in the array and is tolerant of errors in antenna placement. However, the gain of the system may be increased by increasing the number of antenna elements in the array. In some embodiments, the system may function as a communication hub that connects two or more disadvantaged remote users.

The antenna elements may have a radiating element having a length of less than half of the wavelength of an operating frequency of the array. Reduced size of the individual elements allows for smaller footprint for the system than traditional HF systems and enables easy transport and relocation. To compensate for lower efficiency associated with smaller antenna elements, the gain of the system may be increased by adding additional elements to the array.

In some embodiments, an antenna array is provided, the array comprising: a plurality of at least four antennas arranged around a circle, wherein each antenna in the plurality of antennas has a radiating element having a length of less than half of a wavelength of an operating frequency of the array, and a hub, wherein the plurality of antennas are connected to the hub and the hub controls the transmission and reception of signals by the plurality of antennas, wherein the plurality of antennas are equally spaced about the circle and the plurality of antennas are each separated by a distance of at least half of the wavelength of the operating frequency.

In some embodiments of the array, one or more of the plurality of antennas are of a type from the group consisting of a monopole antenna, a half-loop antenna, a spiral-loaded antenna, a magnetic loop antenna, a parasitic wideband Yagi antenna, a dipole antenna, a log-periodic antenna, and an inverted V dipole antenna.

In some embodiments of the array, the plurality of antennas are crossed dipole antennas.

In some embodiments of the array, each of the plurality of antennas is the same type of antenna.

In some embodiments of the array, the array is configured to provide at least as much gain as a single antenna of the same type as the plurality of antennas with a radiating element having a length of at least half the wavelength of the operating frequency.

In some embodiments of the array, the array has a diameter of at least five meters.

In some embodiments of the array, adjacent antennas are separated by at least 10 meters.

In some embodiments of the array, the hub selects, for each of the plurality of antennas, a value by which to increase or decrease a signal received each antenna to change the directivity of the array.

In some embodiments of the array, the radiation pattern of the array does not change based on adding or removing antennas around the circle.

In some embodiments of the array, the array comprises at least 12 antennas.

In some embodiments of the array, one or more of the plurality of antennas has a radiating element having a length of 10 meters or less.

In some embodiments of the array, the array is configured to operate between 3 MHz and 30 MHz.

In some embodiments of the array, the system is configured to operate between 3 MHz and 8 MHz.

In some embodiments of the array, the array is configured to receive left-hand elliptically polarized signals and right-hand elliptically polarized signals.

In some embodiments of the array, the array is configured to operate as a transmit array and a receive array.

In some embodiments of the array, the array is configured to be transportable.

In some embodiments of the array, each of the plurality of antennas is configured to be mounted on one or more vehicles.

In some embodiments, a method for determining a number of antennas in an array is provided, the method comprising: determining an operating frequency of an antenna system; determining a size of a radiating element of an antenna; determining a first number of antennas necessary to achieve a first gain, wherein the number of antennas is based on the size of the radiating element; determining a first diameter of a circular array, wherein the first diameter is based on the first number of antennas and the operating frequency; setting up a circular antenna array having a first radiation pattern and a diameter of at least the first diameter, wherein the circular array comprises a first plurality of at least the first number of antennas arranged around a first circle having the first diameter, and wherein the first plurality of antennas are separated by at least half of a wavelength of the operating frequency.

In some embodiments, the method comprises determining a second number of antennas necessary to achieve a second gain.

In some embodiments, the method comprises determining a second diameter of the circular array, wherein the second diameter is based on the second number of antennas and the operating frequency.

In some embodiments, the method comprises adjusting the circular array such that the array has a second radiation pattern and a diameter of at least the second diameter, wherein the circular array comprises a second plurality of at least the second number of antennas arranged around a second circle having the second diameter, and wherein the second plurality of antennas are separated by half the wavelength of the operating frequency or more.

In some embodiments of the method, the first radiation pattern and the second radiation pattern have the same directivity.

In some embodiments of the method, the second gain is greater than the first gain.

In some embodiments of the method, the first and second diameter are 20 meters or more.

In some embodiments of the method, the operating frequency is between 3 MHz and 30 MHz and the first diameter is between 5 meters and 1,500 meters.

In some embodiments of the method, the operating frequency is between 3 MHz and 8 MHz and the first diameter is between 20 meters and 1,500 meters.

DETAILED DESCRIPTION OF THE DISCLOSURE

Figure 1A:
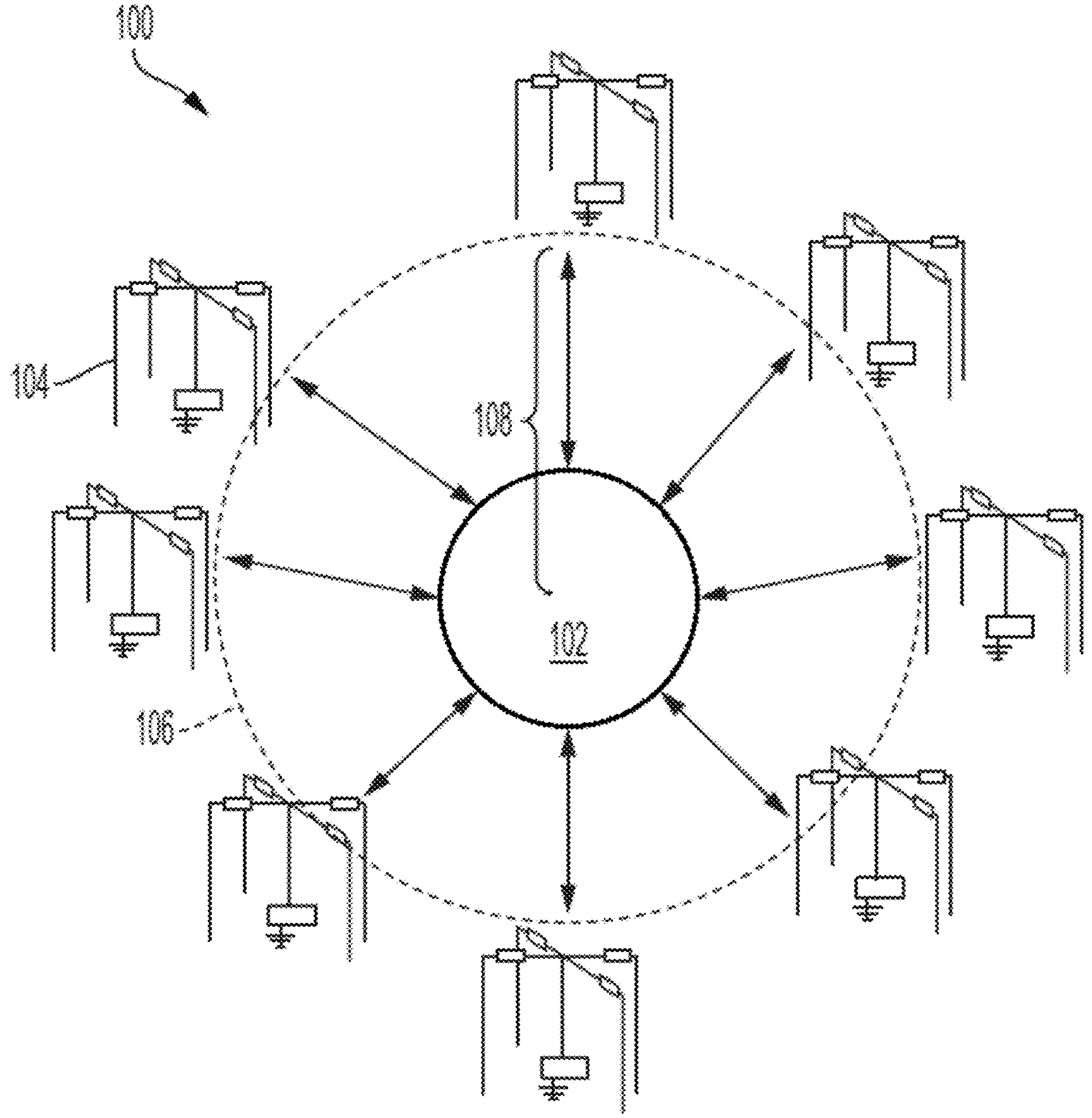
FIG. 1A shows a diagram of a HF system 100, according to some embodiments.

As explained above, current high frequency (HF) communication and radar detection systems often require multiple-element transmit and receive arrays. The arrays are typically spread over a large area and the individual antenna elements are often large in order to maintain efficiency at the relevant operating frequencies, for example between 3 MHz and 30 MHz. The large size of these arrays and their constituent antenna elements pose problems in certain applications. The arrays are often difficult to relocate due to the large size of the antenna elements and the large distance over which they are placed. Additionally, the large arrays are easily detected and identified, such as by overhead surveillance. Thus, there is a need for a high frequency system that maintains high performance that reduces the size of the system and antenna elements and is easily transportable.

A transportable, resilient high frequency system with a compact footprint is provided. The system may include a plurality of antenna elements arranged in a circular array. A circular array provides a resilient radiation pattern that does not change based on the number of antennas in the array and is tolerant of errors in antenna placement. However, the gain of the system may be increased by increasing the number of antenna elements in the array. In some embodiments, the system may function as a communication hub that connects two or more disadvantaged remote users.

In the following description of the disclosure and embodiments, reference is made to the accompanying drawings in which are shown, by way of illustration, specific embodiments that can be practiced. It is to be understood that other embodiments and examples can be practiced, and changes can be made, without departing from the scope of the disclosure.

In addition, it is also to be understood that the singular forms "a," "an," and "the" used in the following description are intended to include the plural forms as well, unless the context clearly indicates otherwise. It is also to be understood that the term "and/or," as used herein, refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units, but do not preclude the presence or addition of one or more other features, integers, steps, operations, elements, components, units, and/or groups thereof.

Reference is sometimes made herein to generation of a radiating beam having a particular shape or beam width. Those of ordinary skill in the art would appreciate that antenna beams having other shapes may also be used and may be provided using known techniques, such as by inclusion of amplitude and phase adjustment circuits into appropriate locations in an antenna feed circuit and/or multi antenna element network.

According to the well-known antenna reciprocity theorem, antenna characteristics in the transmit mode correspond to antenna characteristics in the receive mode. Accordingly, the below description provides certain characteristics of antennas operating in a transmit mode with the intention of characterizing antennas equally in the receive mode.

Described herein are embodiments of high frequency communication and detection systems. The high frequency systems according to certain embodiments exhibit wide bandwidth, long range, and diverse polarization, while having a small footprint and being easily transportable.

A HF system, according to certain embodiments, includes a plurality of antenna elements arranged in a circular array. According to certain embodiments, the elements may be spaced equally about the array, separated by distances of at least half the wavelength of an operating frequency of the system. The wavelength of an operating frequency may be determined by the following equation, where λ is a wavelength, f is an operating frequency, and c is the speed of light:

$$c=\lambda\times f$$

The gain of the system may be increased by increasing the number of elements in the array. The radiation pattern of the system may not vary based on the number of elements in the array. Since elements may be added to increase the gain of the system without changing the radiation pattern, smaller individual antenna elements having lower efficiency may be used to reduce the overall size of the system and making the system more transportable.

FIG. 1A shows a diagram of a HF system 100, according to some embodiments. System 100 may include a hub 102 and a plurality of antenna elements 104.

The antenna elements may be arranged around a circle 106 having a radius 108. In some embodiments, at least a portion of one or more of the antenna elements may overlap with an imaginary circle defining the circular array. In other embodiments, at least a portion of each antenna element may overlap with an imaginary circle defining the circular array.

The antenna elements may be positioned at equal angular intervals around circle 106 at a distance from the center of the circle corresponding to radius 108. In some embodiments, the spacing between adjacent antenna elements may depend on an operating frequency of the system. For example, in a preferred embodiment, the distance between an antenna element and adjacent antenna elements may be about half the wavelength of an operating frequency of the system to reduce mutual coupling between the antenna elements. Thus, the diameter of the circle may increase as the number of antennas increases. Mutual coupling between the antennas and grating lobes in the gain factor are minimized with half wavelength spacing between antennas.

Due to the symmetry of a circular array, the radiation pattern of the system does not change as the number of antennas changes. The gain of the system may depend on the number of antennas in the array. For example, the gain of the system may be increased by increasing the number of antenna elements in the array. Thus, the gain of the system may be increased by adding antennas without affecting the radiation pattern of the system.

In some embodiments, the length of a radiating element of one or more antenna elements may be less than half the wavelength of an operating frequency. As the size of the radiating element of an antenna decreases relative to half the wavelength of an operating frequency, the radiation efficiency of the antenna may also be reduced. Radiation efficiency is the ratio of the total power radiated by an antenna to the input power. As the size the radiating element of an antenna is reduced, the radiation resistance of the antenna is reduced, which may reduce radiation efficiency. To compensate for reduced gain due to inefficiency, multiple antennas may be placed in an array having an array gain factor greater than the gain of constituent antennas.

In some embodiments, the array may be configured to provide at least as much gain as a single antenna of the same type and design as the plurality of antennas in the array, including the same material, shape, and other design parameters, with a radiating element having a length of at least half of a wavelength of the operating frequency of the array. For example, an array of four antennas, each antenna having an efficiency of 25% compared to a single half wavelength antenna at an operating frequency, may provide the same gain as a single half wavelength antenna. An array of eight antennas, each antenna having an efficiency of 25% compared to a single half wavelength antenna at an operating frequency, may provide 3 dB of gain relative to a single half wavelength antenna.

The overall size of the array may be reduced by reducing the size of one or more antennas in the array. To compensate for inefficiency due to smaller individual antenna elements, the gain of the array may be increased by increasing the number of antennas in the array. By increasing the number of antenna elements in an array, an array comprising small antennas relative to the operating frequency may achieve at least the same gain as a similar antenna with a radiating element having a length of half the wavelength of the operating frequency.

Reduced size of antenna elements may facilitate mobility. Antenna elements and/or the hub may not be permanently installed. For example, in some embodiments, antenna elements and/or hub equipment may be configured to be transported by vehicles. In other embodiments, antenna elements and/or hub equipment may be configured to be mounted on vehicles.

The antenna elements may comprise any type of antenna. For example, the antennas may be a monopole antenna, a half-loop antenna, a spiral-loaded antenna, a magnetic loop antenna, a parasitic wideband Yagi antenna, a dipole antenna, a log-periodic antenna, an inverted V dipole antenna, or other type of antenna. The antennas may be commercially available antennas, such as a WinRadio Ax-81 SM Active LF-HF Monopole Antenna, COBHAM Wideband Antenna HFIA 6249, V-252 29-foot Whip Antenna, Pixel Technologies Magnetic Broadband Active Loop Antenna RF PRO-1, RF-PRO 1A, RF-PRO 1B, CODAN 3040 Automatic WHIP Antenna, or other type of antenna. In some embodiments, the antenna elements may be configured to be mounted on vehicles.

The antenna elements may have any polarization. For example, the antenna elements may be vertically polarized, horizontally polarized, right hand elliptically polarized, left hand elliptically polarized, or have other polarization.

HF propagation is influenced by the Earth's magnetic field lines, polarizing as it passes through ionospheric plasma. When a charge is accelerated in an antenna, electromagnetic waves of electric and magnetic fields are generated which propagate through the atmosphere. The direction of propagation of the EM waves is accompanied by electric and magnetic vectors, which are perpendicular to each other. The direction of the electric field vector defines the polarization of the field, which is affected by the orientation of the antenna. The electric field vector is parallel to the flow of the current in the antenna. When an antenna element is linear and is placed parallel or horizontal to the Earth, it will radiate a horizontally polarized electric field; an antenna that is slanted radiates an electric field that has both horizontal and vertical components.

Because all antennas are reciprocal, the electric field induces the greatest current on a receive antenna when an incoming electric field is aligned with the orientation of the receive antenna. Misalignment of an antenna to the electric field reduces the amount of current being induced at the antenna, reducing the signal strength in the antenna. This is called cross-polarization. When an antenna and an electric field are perpendicular to each other, minimal current is induced in the antenna and the received signal may be weak. Therefore, optimal BLOS communication links result if the antennas of transmit and receive elements have matching polarization. However, for long distance communications where the fields interact with the ionosphere, this rule of thumb is not effective. HF signals incident on the ionosphere separate into X and O elliptically polarized and orthogonal modes at mid latitude propagation paths.

In some embodiments, one or more of the antenna elements in the array may have multiple polarizations. This "polarization diversity" allows the antenna to transmit and/or receive signals having multiple polarizations. In some embodiments, every antenna element in the array may have the same polarization. The system may have diverse polarization by comprising individual antennas that are polarization diverse.

In some embodiments, the array may transmit polarization diverse signals into the atmosphere. At NVIS distances, fields are generally circularly polarized as they propagate down toward a user. Although circularly polarized fields may result in a 3 dB loss of signal when received by a linearly polarized antenna, such as by a user in the field, polarization diversity may be advantageous because users need not be concerned with antenna alignment.

The antenna elements may also have any transmit power. For example, an antenna element may be configured to transmit an average power of 150 W. Lower power antenna elements may increase the mobility of an array because they may weigh less than higher power antennas.

In some embodiments, different antenna elements in the array may be configured to transmit different amounts of power. In some embodiments, one or more antenna elements may have a transmit power of 10 W or less, 50 W or less, 100 W or less, 150 W or less, 250 W or less, or 500 W or less. In other embodiments, one or more antenna elements may have a transmit power of at least 10 W, at least 50 W, at least 100 W, at least 150 W, at least 250 W, or at least 500 W.

Hub 102 may control the system. The hub may include any components necessary to operate the system and control the antenna elements, such as radios, computers, switches, routers, or other equipment. The antenna elements may be connected to the hub by wires, such as coaxial cables, by a wireless communication interface, such as WiFi, 802.11, Bluetooth, or other standard, by free space optical communication, or by other connection.

The hub may control the distributed antennas and coordinate the transmission and/or reception of signals. For example, the hub may implement directional beamforming by controlling the phase and/or timing of signal transmission by each antenna.

In some embodiments, the array may operate as both a transmit and receive array. Co-location of transmit and receive functions reduces the size and complexity of the system, making the system more transportable. To enable co-location of transmit and receive functions, hub 102 may control duplexing of the transmit and receive operations. If users are within NVIS distances of the array, receive incident angles may be high elevation and may have near constant path loss between users. Propagation delays between the users and the hub may be consistent if users are all within NVIS distances. Consistent propagation delay between users may facilitate planning for duplexing of transmit and receive operations of the hub.

The system may be configured to operate at certain frequencies or within certain ranges frequency ranges. In some embodiments, the system may be configured to operate at a frequency of 1 kHz or less, 100 kHz or less, 1 MHz or less, 3 MHz or less, 5 MHz or less, 14 MHz or less, 30 MHz or less, 50 MHz or less, or 100 MHz or less. In other embodiments, the system may be configured to operate at a frequency of at least 1 kHz, at least 100 kHz, at least 1 MHz, at least 3 MHz, at least 5 MHz, at least 8 MHz, at least 14 MHz, at least 30 MHz, at least 50 MHz, or at least 100 MHz.

In still further embodiments, the system may be configured to operate between 3 MHz and 8 MHz, between 3 MHz and 10 MHz, or between 3 MHz and 30 MHz.

The system may be configured to operate over certain distances or within certain ranges of distances. For example, in some embodiments, the system may be configured to operate at near vertical incidence Skywave (NVIS) ranges of 50 km to 650 km. In other embodiments, the system may be configured to operate at Skywave ranges of at least 5,000 km.

In the example of FIG. 1, the system comprises 8 antenna elements. However, the system may include any number of antenna elements. For example, in some embodiments, the system may include at least 4 elements, at least 8 elements, at least 12 elements, at least 25 elements, at least 50 elements, at least 100 elements, at least 500 elements, or at least 1,000 elements. In other embodiments, the system may include 4 elements or less, 8 elements or less, 12 elements or less, 25 elements or less, 50 elements or less, 100 elements or less, 500 elements or less, or 1,000 elements or less.

The diameter of the array may depend on the number of antennas in the array. Because the spacing of the antennas may depend on an operating frequency of the system, the diameter of the array may also depend on an operating frequency of the system.

In some embodiments, the array may have a diameter 5 meters or less, 15 meters or less, 50 meters or less, 100 meters or less, 500 meters or less, 1000 meters or less, or 1500 meters or less. In other embodiments, the array may have a diameter of at least 5 meters, at least 15 meters, at least 50 meters, at least 100 meters, at least 500 meters, at least 1000 meters, or at least 1500 meters.

Where the distance between adjacent elements is about half the wavelength of an operating frequency $\lambda_0$, the diameter of an array having N elements may be given by the equation:

$$D = \frac{\lambda_0}{2}\csc\left(\frac{\pi}{N-1}\right)$$

Example 1: Ten Element Array Operating at 5 MHz

Figure 1B:
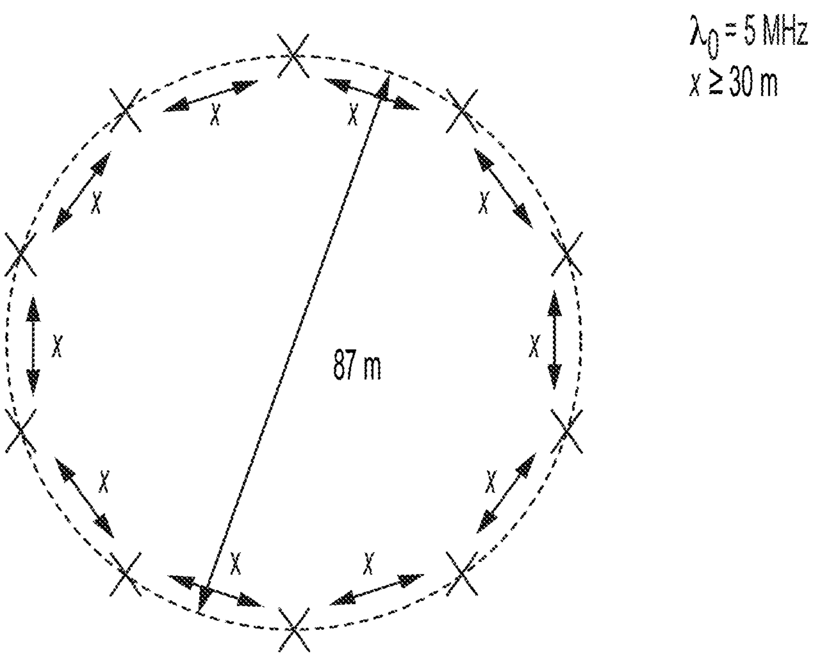
FIG. 1B shows a first example of a ten element array, according to some embodiments.

FIG. 1B shows a ten element array and an operating frequency, $\lambda_0$, of 5 MHz, according to some embodiments. A system operating at 5 MHz may correspond to a wavelength of about 59.95 meters. Thus, adjacent antennas in the array may be separated by at least about 30 meters, or about half the wavelength of the operating frequency of the system. A circular array comprising ten elements separated by about 30 meters may have a diameter of about 87 meters.

Example 2: Ten Element Array Operating at 14 MHz

Figure 1C:
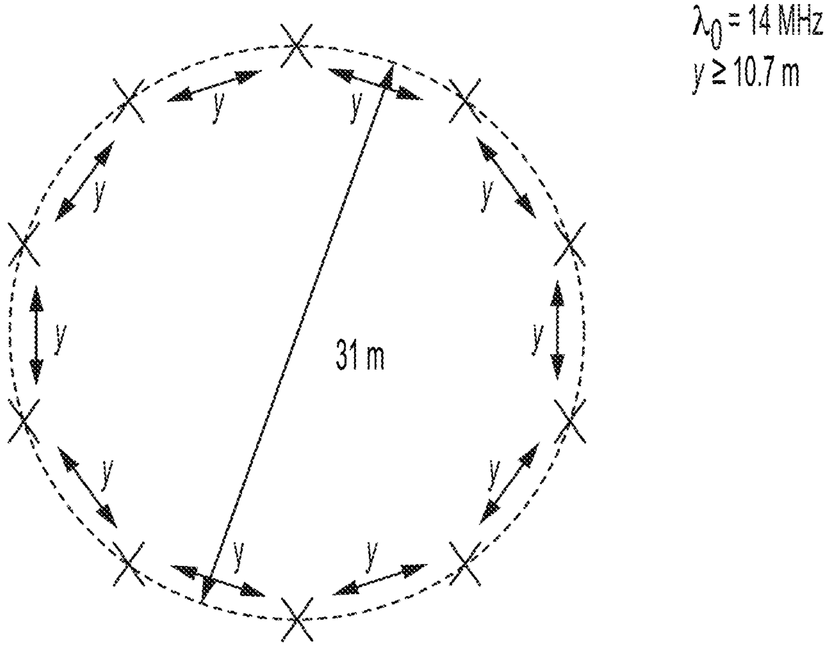
FIG. 1C shows a second example of a ten element array, according to some embodiments.

FIG. 1C shows a ten element array and an operating frequency, $\lambda_0$, of 14 MHz, according to some embodiments. A system operating at 14 MHz may correspond to a wavelength of about 21.4 meters. Thus, adjacent antennas in the array may be separated by at least about 10.7 meters, or about half the wavelength of the operating frequency of the system. A circular array comprising ten elements separated by about 10.7 meters may have a diameter of about 31 meters.

Because wavelength increases as operating frequency increases, an array in which antenna elements are suitably spaced for operation at a first frequency (that is, separated by at least half the wavelength of the first frequency) will also have suitable spacing for operation at a second frequency, where the second frequency is greater than the first frequency.

The antenna elements may be of any size. For example, the radiating element of an antenna may have a length of 30 meters. Typically, antennas with a radiating element having a length of at least half the wavelength of an operating frequency demonstrate improved efficiency. Antennas with a radiating element having a length of less than half the wavelength of an operating frequency may continue to operate, but may have lower efficiency. However, in a circular array, antenna elements with a radiating element having a length substantially less than half the wavelength of an operating frequency may be used. Reduced efficiency of individual antenna elements may be compensated for by increasing the number of elements in the array, increasing the gain of the system.

In some embodiments, the size of the radiating element of one or more antennas may depend on an operating frequency of the system. The length of a radiating element of one or more antennas may be equal to half the wavelength of an operating frequency $\lambda$ of the system. In some embodiments, the length a radiating element of one or more antennas may be 3.0$\lambda$ or less, 2.0$\lambda$ or less, 1.5$\lambda$ or less, 1.0$\lambda$ or less, 0.75$\lambda$ or less, 0.5$\lambda$ or less, or 0.25$\lambda$ or less. According to other embodiments, the length of a radiating element of one or more antennas may be at least 0.1$\lambda$, at least 0.25$\lambda$, at least 0.5$\lambda$, at least 0.75$\lambda$, at least 0.8$\lambda$, at least 1.0$\lambda$, at least 1.5$\lambda$, or at least 2.0$\lambda$.

In some embodiments, the length of a radiating element of one or more antennas may be 1 meter or less, 5 meters or less, 10 meters or less, 25 meters or less, 50 meters or less, or 100 meters or less. In other embodiments, the length of a radiating element of one or more antennas may be at least 1 meter, at least 5 meters, at least 10 meters, at least 25 meters, or at least 100 meters.

Figure 2:
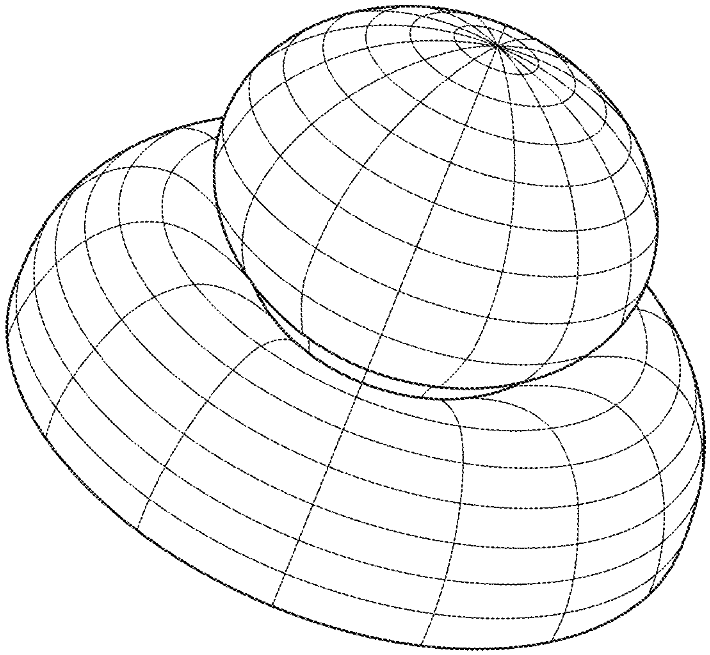
FIG. 2 shows an array gain factor for a circular array, according to some embodiments.

FIG. 2 illustrates a radiation pattern for a circular array, according to some embodiments.

All antennas exhibit directivity. The intensity of radiation is generally not equal in all directions. The directivity of an antenna may be based on size, shape, an antenna's position and orientation relative to the Earth and its surface interactions, and/or other factors. The phenomenon of radiating more energy in some particular direction over others is defined as directivity and forms a radiation pattern around the antenna. In a distributed antenna system, angular radiation patterns of individual antenna elements can combine to generate a beam that has high directivity in one direction while minimizing directivity in others. From the perspective of a receiver, directivity can be used for direction finding, jamming mitigation, and increased sensitivities. Directivity may be defined as:

$$D(\hat{r}) = \frac{\text{radiation intensity in direction of } \hat{r}}{\text{average radiation intensity}} = \frac{U(\hat{r})}{\frac{1}{4\pi}\int_{S^2} U(\hat{r})dS},$$

where $S^2$ denotes the unit sphere and $\hat{r}$ is the unit direction. Alternatively, $\hat{r}$ can be replaced with $(\theta,\phi)$, which represent elevation and azimuth angles, respectively.

The radiation intensity is described by the Poynting Vector as:

$$U(\hat{r}) = \frac{r^2}{2}\hat{r}\cdot Re[E(r)\times H^*(r)]$$

The Poynting vector describes the flow of electromagnetic power per area in space. The radiation intensity U describes the radiation of electromagnetic waves in power (watts) at a distance r. This intensity is not uniform and varies around an antenna in azimuth and in elevation, which results in an antenna radiation pattern. Antenna gain in the direction r may be defined by how well the antenna converts input power into radiation in that direction. Antenna gain is related to directivity by the radiancy efficiency of the antenna, which is the ratio of the total radiated power to the input power. Thus, gain may be defined as:

$$G(\hat{r})=\eta D(\hat{r}),$$

where $\eta$ is the efficiency of an antenna. Most modern antennas have high efficiency. However, efficiency drops as the size of a radiating element of an antenna decreases relative to the wavelength of an operating frequency. Furthermore, as a radiating element of an antenna becomes much smaller than the wavelength of an operating frequency, the antenna loses directivity and exhibits an increasingly omnidirectional radiation pattern.

For a circular array in which the antenna elements are placed at equal radii and with equal angular spacing, the array factor, AF$(\theta,\phi)$, may be given by:

$$\frac{1}{\sqrt{N}}\sum_{k=1}^{N} w_n \text{Exp}\left(jkr\left(\sin\theta\cos\phi\cos\left(\frac{2\pi}{N}(k-1)\right)+\sin\theta\sin\phi\sin\left(\frac{2\pi}{N}(k-1)\right)\right)\right),$$

where N is the number of elements in the array, r is the radius of the array, and $w_n$ is the weight for each antenna. A weight may correspond to a value by which a signal transmitted by or received from an antenna is increased or decreased. Due to the symmetry of a circular array, the array will maintain the same radiation pattern when the number of elements changes.

Example 3: Eight Element Array Operating at 5 MHz

In the example of FIG. 2, the radiation pattern is based on an array of 8 antennas having a crossed dipole geometry. Crossed dipole antennas may generate isotropic omni-directional, dual polarized, and circularly polarized radiation. A crossed dipole may be used for single-band, multi-band, and wideband operations. A crossed dipole may efficiently transmit dual polarized fields because it may be effective against fading. Further, a crossed dipole may improve communications by transmitting both vertical and horizontal polarizations simultaneously.

In the example of FIG. 2, the antennas in the modeled array have radiating elements with a length of about 30 meters and are located about 12 meters above ground, or 0.2λ at an operating frequency of 5 MHz. The simulated array is configured to operate at 5 MHz. An array comprising crossed dipole antennas may enable dual left hand circular polarized (LHCP) and right hand circular polarized (RHCP) propagation for X and O mode separation.

A system operating at 5 MHz may correspond to a wavelength of about 59.95 meters. Thus, adjacent antennas in the array may be separated by at least about 30 meters, or about half the wavelength of the operating frequency of the system. A circular array comprising eight elements separated by about 30 meters may have a diameter of about 69 meters.

The simulated antennas are comprised of copper and have a diameter of about 1 centimeter. The dry earth relative permittivity is assumed to be 10 farads per meter and the dry earth conductivity is assumed to be 0.001 Siemens per meter. To achieve 90 degree phasing between the two dipoles, an ideal 4-port 90 degree hybrid is assumed, with a 50Ω load attached to the isolated port. Use of a 4-port 90 degree hybrid allows for the transmit or receive source to have minimal input reflection, at the cost of antenna mismatch efficiency. In practice, several different methods for matching the antenna can be achieved including switched filter banks as well as active tuning units.

With the weights of all antennas equal, the array gain factor is maximum directly at zenith. The radiation pattern remains substantially constant regardless of the number of elements in the array due to the symmetry of the array. For an 8 element array, the radiation pattern may have a −3 dB point at about 21° for all azimuth angles. Thus, the simulated 8 element array has a 3 dB beamwidth of about 42°. Due to the symmetry of the array, the beamwidth remains constant regardless of the number of antennas in the array. Only the gain changes with the number of antennas.

The gain factor has a deep null at about 50° that provides greater than 40 dB of isolation.

The gain pattern has a main-lobe to side-lobe ratio of about 10.4 dB.

For long distance HF communications, low launch angles are preferable. The radiation pattern of an antenna determines the maximum radiation at the desired launch angle. In some embodiments, the preferred angle for intercontinental contacts at high frequencies is about 15° or less. For horizontally polarized antennas, such as the crossed dipole in the example of FIG. 2, the height of the antenna above ground and the operating frequency may determine the launch angle.

The antennas may be placed at various heights above ground. In some embodiments, one or more antennas may be placed at least 0.05λ above ground, at least 0.1λ above ground, at least 0.2λ above ground, or at least 0.25λ above ground. In some embodiments, one or more antennas may be placed 0.05λ above ground or less, 0.1λ above ground or less, 0.2λ above ground or less, or 0.25λ above ground or less.

In some embodiments, the distance that an antenna element may be above ground may be 1 meter or less, 5 meters or less, 12 meters or less, 25 meters or less, 50 meters or less, or 100 meters or less. In other embodiments, the distance that an antenna element may be above ground may be at least 1 meter, at least 5 meters, at least 12 meters, at least 25 meters, at least 50 meters, or at least 100 meters.

Figure 3:
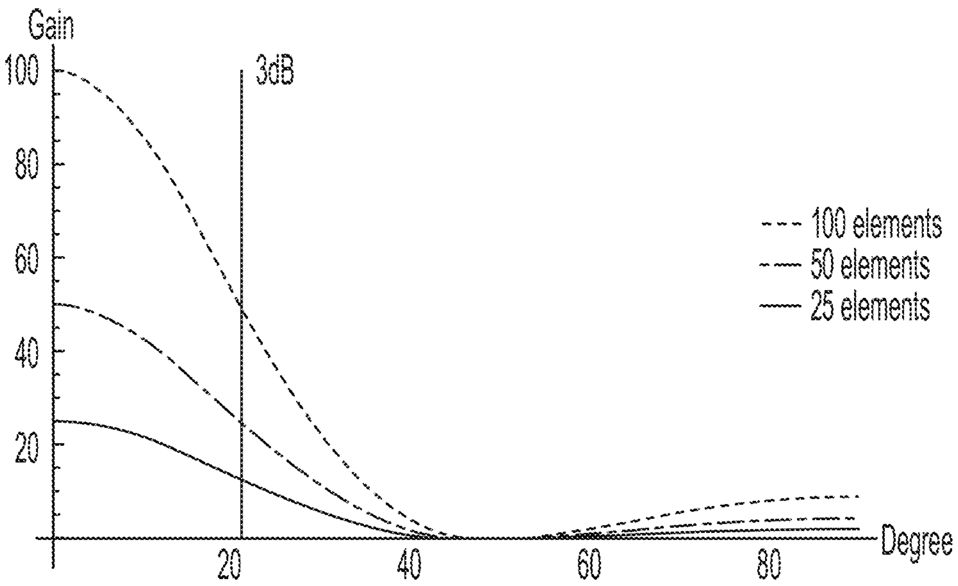
FIG. 3 shows gain factor curves for circular arrays with different numbers of elements, according to some embodiments.

FIG. 3 shows gain factor curves for circular arrays having different numbers of elements, according to some embodiments. Because the radiation pattern does not change with the number of antenna elements, each array has a −3 dB point at about 21° for all azimuth. The gain increases approximately linearly with the number of antennas in the array. For example, a 100-antenna array may have approximately twice as much gain as a 50-antenna array and approximately four times as much gain as a 25-antenna array.

Figure 4:
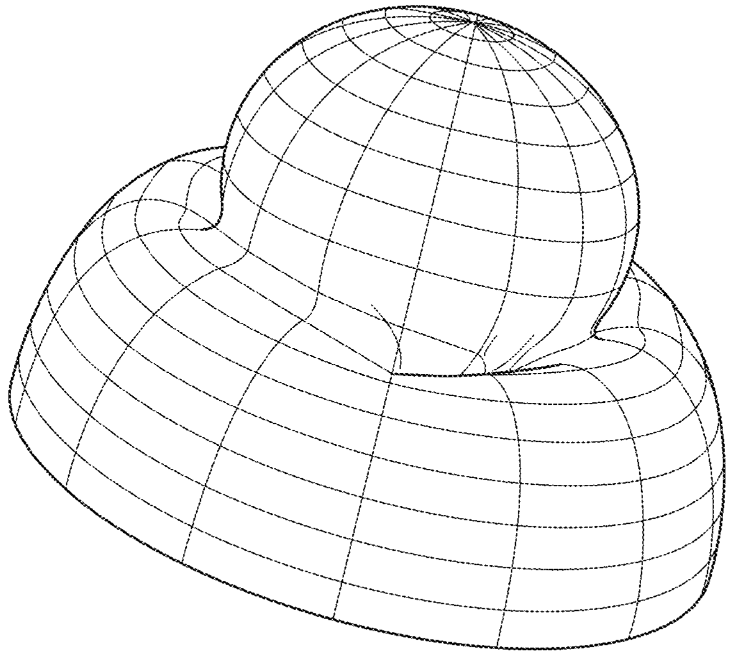
FIG. 4 shows a radiation pattern for a circular array with radial placement error, according to some embodiments
Figure 5:
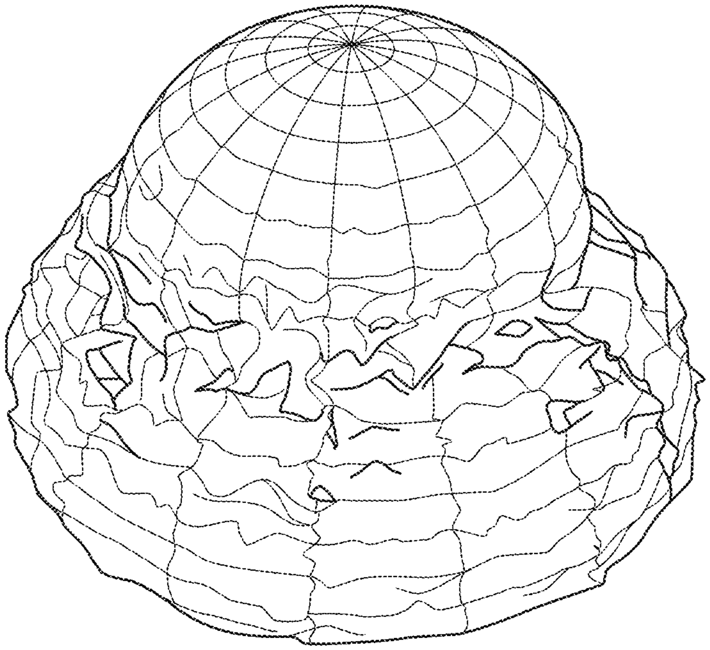
FIG. 5 shows a radiation pattern for a circular array with angular placement error, according to some embodiments

The circular array provides a resilient radiation pattern. That is, the radiation pattern of a circular array may remain substantially unchanged despite errors in the placement of individual antenna elements. For example, the array may tolerate errors in the radial and/or angular placement of individual antennas, as illustrated by FIGS. 4 and 5.

Where antenna elements are spaced equally about the circular array with separation of about half the wavelength of an operating frequency $\lambda_0$, the radius of the array may be given by the equation:

$$r = \frac{\lambda_0}{4}\csc\left(\frac{\pi}{N-1}\right)$$

However, in some embodiments, one or more array elements may have some radial placement error. FIG. 4 shows a radiation pattern for a circular array with radial placement error, according to some embodiments. In the example of FIG. 4, antennas in the array have radial placement errors of up to about 30% relative to a radius based on half-wavelength spacing. The average −3 dB point is about 19.6° and the average 3 dB beamwidth is about 39°.

In some embodiments, the distance of one or more antennas from the center of the array may be at least 0.25λ, at least 0.3λ, at least 0.4λ, at least 0.5λ, at least 0.6λ, at least 0.7λ, or at least 0.75λ. In some embodiments, the distance of one or more antennas from the center of the array may be 0.25λ or less, 0.3λ or less, 0.4λ or less, 0.5λ or less, 0.6λ or less, 0.7λ or less, or 0.75λ or less.

In some embodiments, the distance of one or more antennas from the center of the array may be 2.5 meters or less, 7.5 meters or less, 25 meters or less, 50 meters or less, 250 meters or less, 500 meters or less, or 750 meters or less. In other embodiments, the distance of one or more antennas from the center of the array may be at least 2.5 meters, at least 7.5 meters, at least 25 meters, at least 50 meters, at least 250 meters, at least 500 meters, or at least 750 meters.

In some embodiments, the antennas may not be placed at equal angular intervals about the center of the array. FIG. 5 shows a radiation pattern for a circular array with angular placement error, according to some embodiments. In the example of FIG. 5, antennas in the array have angular placements errors of up to about 30% relative to half the wavelength of an operating frequency. Angular placement errors do not severely impact the gain factor. The average −3 dB point is about 21°, and the average 3 dB beamwidth is about 42°.

In some embodiments, adjacent antenna elements may be spaced at a distance equal to about half the wavelength of an operating frequency (λ) of the system. In some embodiments, the angular distance between adjacent antennas may be at least 0.25λ, at least 0.3λ, at least 0.4λ, at least 0.5λ, at least 0.6λ, at least 0.7λ, or at least 0.75λ. In some embodiments, the angular distance between one or more adjacent antennas may be 0.25λ or less, 0.3λ or less, 0.4λ or less, 0.5λ or less, 0.6λ or less, 0.7λ or less, or 0.75λ or less.

In some embodiments, adjacent antenna elements may be spaced at a distance of 1 meter or less, 5 meters or less, 10 meters or less, 25 meters or less, 50 meters or less, or 100 meters or less. In other embodiments, adjacent antenna elements may be spaced at a distance of at least 1 meter, at least 5 meters, at least 10 meters, at least 25 meters, at least 50 meters, or at least 100 meters.

Figure 6:
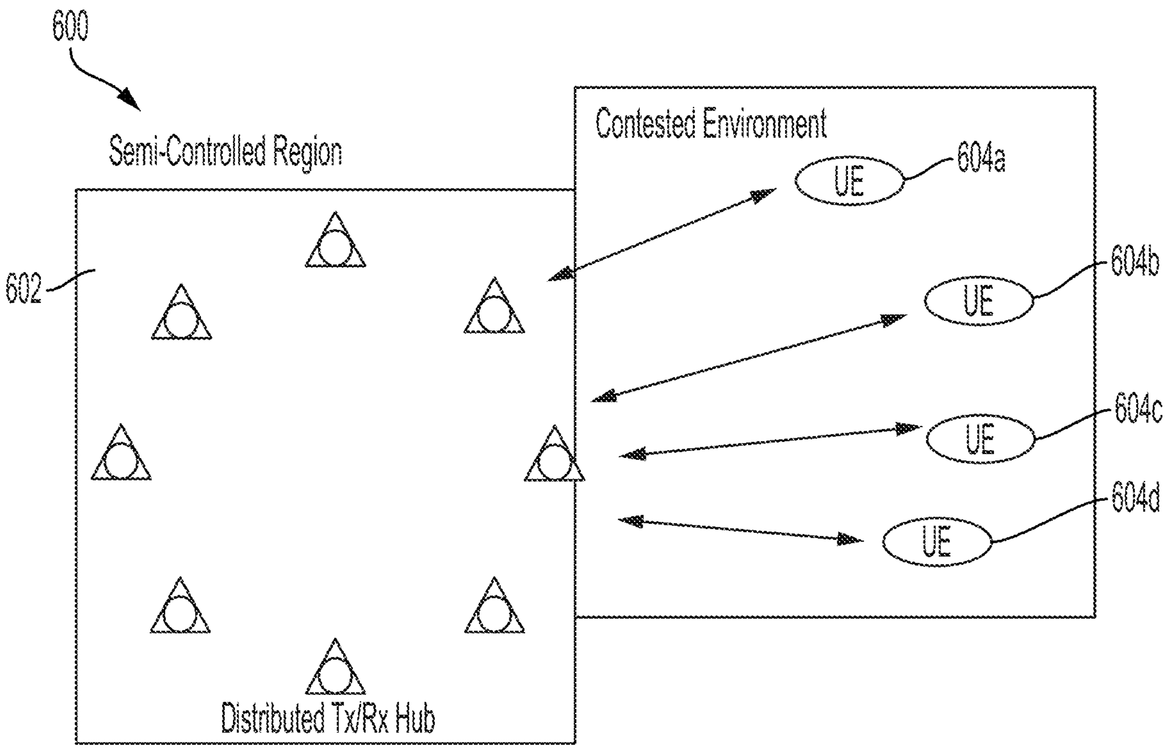
FIG. 6 shows a communication network 600, according to some embodiments.

The HF system may be configured to detect or communicate with one or more users. FIG. 6 shows a communication network 600, according to some embodiments. The network includes HF system 602, such as HF system 100 described with respect to FIG. 1, above, and user equipment 604*a*-604*d*.

The system may be used for communication and/or radar. The system may be used to transmit signals, receive signals, or both. Hub 108 may control the distributed antenna elements and coordinate the transmission and reception of signals.

HF system 602 may be small enough to transport the whole system, including antennas, radios, and all associated equipment such as computers, switches, routers, and cables, using vehicles.

The system may be used to communicate with one or more users. A user may communicate with the system using user equipment (UE) 104*a*-104*d*. User equipment may transmit signals to and/or receive signals from the HF system.

User equipment may comprise one or more antennas. A UE antenna may be of any type. For example, a UE antenna may comprise a linearly polarized antenna, such as a center-fed doublet antenna, a half-loop antenna, or other type of antenna. A UE antenna may be a commercially available antenna, such as a Cobham antenna.

User equipment may also have any transmit power. For example, user equipment may be configured to transmit an average power of at least 10 W, at least 25 W, at least 50 W, at least 75 W, or at least 100 W. In other embodiments, user equipment may be configured to transmit an average power of 100 W or less, 75 W or less, 50 W or less, 25 W or less, or 10 W or less.

A UE antenna may have diverse polarization so that antenna alignment does not affect operation. A UE antenna may be configured to be mounted on a vehicle to facilitate mobility.

In some embodiments, a user may be located at least 100 km from the system, at least 500 km from the system, at least 1,000 km from the system, or at least 5,000 km from the system. In other embodiments, a user may be located 100 km from the system or less, 500 km from the system or less, 1,000 km from the system or less, or 5,000 km from the system or less.

Figure 7:
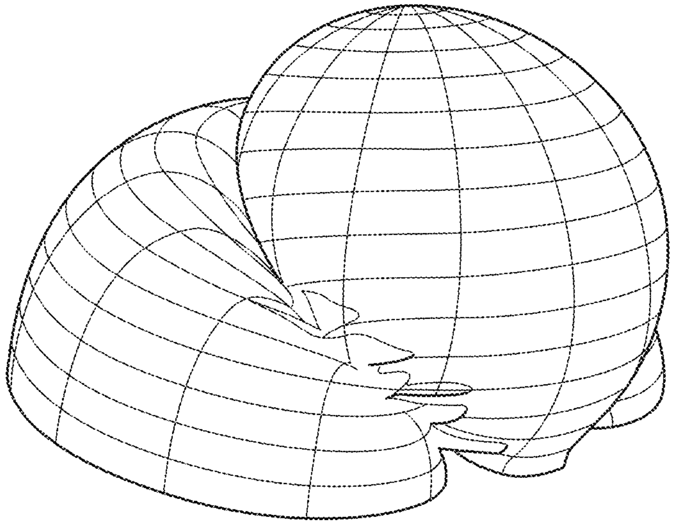
FIG. 7 shows an array gain factor for a circular array with beamforming, according to some embodiments.

FIG. 7 shows an array gain factor for a circular array with beamforming, according to some embodiments. In some embodiments, beamforming may be used to increase the gain of the radiation pattern of the array in a desired direction and/or suppress the gain of the radiation pattern in an undesired direction. Beamforming may also compensate for inefficiency due to the use of smaller antennas by increasing gain in a desired direction.

In the example of FIG. 7, the modeled array includes eight antennas and the beam is steered 15° from zenith and 100° in azimuth. The gain factor has an average 3 dB beamwidth of about 42° and includes a null that provides greater than 40 dB of isolation.

In some embodiments, the hub may implement beamforming to control the directivity of the array. For example, the hub may control the phase of the signals feeding the antennas such that the effective radiation pattern of the array is reinforced in a desired direction and/or suppressed in an undesired direction.

Alternatively, the hub may apply different weights to each antenna in the array to modify the radiation pattern. Weighting may refer to selecting values by which a signal transmitted by or received from an antenna may be increased or decreased. Through the use of weighting, a beam pattern may be formed in the direction of an elevation, θ, and an azimuth, ϕ. By directing the beam in a direction of signal reception, a higher signal-to-noise-ratio (SNR) may be achieved.

Weighting may result in constructive interference between the antennas in some directions, increasing gain and/or reception, and destructive interference between the antennas in other directions, decreasing gain and/or reception. In this way, the system may transmit signals with a higher SNR to users in desired directions. Beamforming may also be used to suppress noise in undesired directions, such as from interference or jammers, by directing nulls in the radiation pattern toward undesired signals. The effect of interference may also be mitigated through the use of spread spectrum techniques, such as frequency hopping, direct-sequence spread spectrum modulation, or other techniques.

The far electric field from an array may be described by a radiation vector and its array factor:

$$F(\hat{r})=\Sigma_{i=0}^{N-1} w_i e^{-jk\hat{r}\cdot d_i\hat{l}_i} f_i(\hat{r})$$

The radiation vector may be rewritten in terms of an array vector and a weighting vector if each antenna element has the same current distribution:

$$F(\hat{r})=f(\hat{r})\Sigma_{i=0}^{N-1} w_i e^{-jk\hat{r}\cdot d_i\hat{l}_i}$$

The weight vector and array vector may be described as:

$$w=[w_1 \ldots w_n]^T$$

$$a(\hat{r})=[e^{-jkd_1\hat{r}\cdot\hat{l}_1} \ldots e^{-jkd_n\hat{r}\cdot\hat{l}_n}]^T$$

With an appropriate coordinate transformation, a(r̂) may be transformed to a(θ,ϕ). Weights may be determined such that $w^T a(\theta,\phi)=1$, while minimizing interference and maximizing signal. Optimal weights may result may steer the radiation pattern of the array such that the gain of the array is at a maximum at a desired elevation and azimuth angle.

The weight vector and array vector may also depend on array configuration. If a radiation pattern provides additional degrees of freedom, a weighting vector may be determined such that noise from interferers is minimized by directing noise into deep nulls of the radiation pattern, improving SNR.

Weights may be determined in several ways, including but not limited to the following approaches.

1. Identify a minimum mean square error (MMSE) of a signal. With this approach, the solution may be a Wiener filter, and the optimal weight solution may depend on an adequate estimate of signal power and received signal covariance. In some HF applications, signal power is not easily predicted because of the variability of the medium of which the HF electromagnetic waves propagate.

2. Maximize SNR. With this approach, the weight solution may correspond to a matched filter solution and requires an estimate of noise covariance.

3. Determine maximum likelihood (ML) estimate of a signal. With this approach, the weight solution requires an estimate of noise covariance and a signal estimate, which may correspond to the signal estimate of MVDR, below.

4. Minimum variance distortionless response (MVDR) beamformer. This approach provides an optimal weight solution requiring only an estimate of covariance of a received signal, which can be estimated based on a direct measurement of data, and noise covariance and the signal covariance may not be required. An additional parameter may be included corresponding to statistics of an interferer, and weights may be determined based on a Lagrange function that isolate an interferer and maximize the signal to interference plus noise ratio (SINR).

For a signal $z=a(\theta,\phi)s+j+c+n$, where j is a man-made interfering signal, c is clutter, and n is thermal noise modeled as white Gaussian noise, an output signal can be the scalar $y=w^Hz$. If a constraint $w^Ha(\theta,\phi)=1$ is added, the output signal may become $y=s+w^Hj+w^Hc+w^Hn$.

Assuming that signal power, interferer signal, clutter, and thermal noise are uncorrelated, an expectation of the signal power may be represented as:

$$E\{|y|^2\}=E\{|s|^2\}+E\{|w^Hj|^2\}+E\{|w^Hc|^2\}+E\{|w^Hn|^2\}$$

Optimal weights may minimize the power of the interferer, clutter, and thermal noise, which may be determined through the method of Lagrange to determine, $$\min_w E\{|y|^2\}$$

with the constraint $w^Ha(\theta,\phi)=1$.

The Lagrangian function can be defined as:

$$L(w,\lambda)=E\{w^Hzz^Hw\}-\lambda(w^Ha(\theta,\phi)-1)-\lambda^*(w^Ha(\theta,\phi)-1)$$

The noise covariance can be represented as $R_{zz}=E\{w^Hzz^Hw\}=aa^H+E\{jj^H\}+E\{cc^H\}+E\{nn^H\}$, which may be broken into a combination of three covariances: interferer, clutter, and noise. If noise is assumed to be uncorrelated white Gaussian noise, then $E\{nn^H\}=\sigma_n^2I$.

By taking the derivative of the Lagrange function with respect to the weight vector and solving for the Lagrange multiplier, the optimal weighting vector may be:

$$w_{opt}=\frac{R_{zz}^{-1}a(\theta,\phi)}{a^H(\theta,\phi)R_{zz}^{-1}a(\theta,\phi)}$$

An optimal weighting vector may be discovered by a noise covariance matrix. By estimating the interferer's statistics, weights may be better optimized. The signal estimate may be:

$$s_{est}=\frac{a^H(\theta,\phi)R_{zz}^{-1}z}{a^H(\theta,\phi)R_{zz}^{-1}a(\theta,\phi)}$$

Because weights steer the beam of an array, an optimal solution that minimizes an interferer may steer the beam in such a way to minimize the contribution of an interferer as much as possible.

Alternatively, the directivity of the system may be determined based on the directivity of the individual antennas. In a distributed system, such as a circular array, the radiation patterns of individual antenna elements can combine to generate a radiation pattern for the array that has high directivity in a desired direction and low directivity in other directions.

Antennas lose directivity as size of a radiating element is reduced relative to wavelength, becoming increasingly omnidirectional. An array may compensate for decreased individual directivity by shaping a plurality of individual omnidirectional radiation patterns into a directive radiation pattern, such as by controlling the phase and/or timing of transmission from each antenna or by applying weighting.

Figure 8:
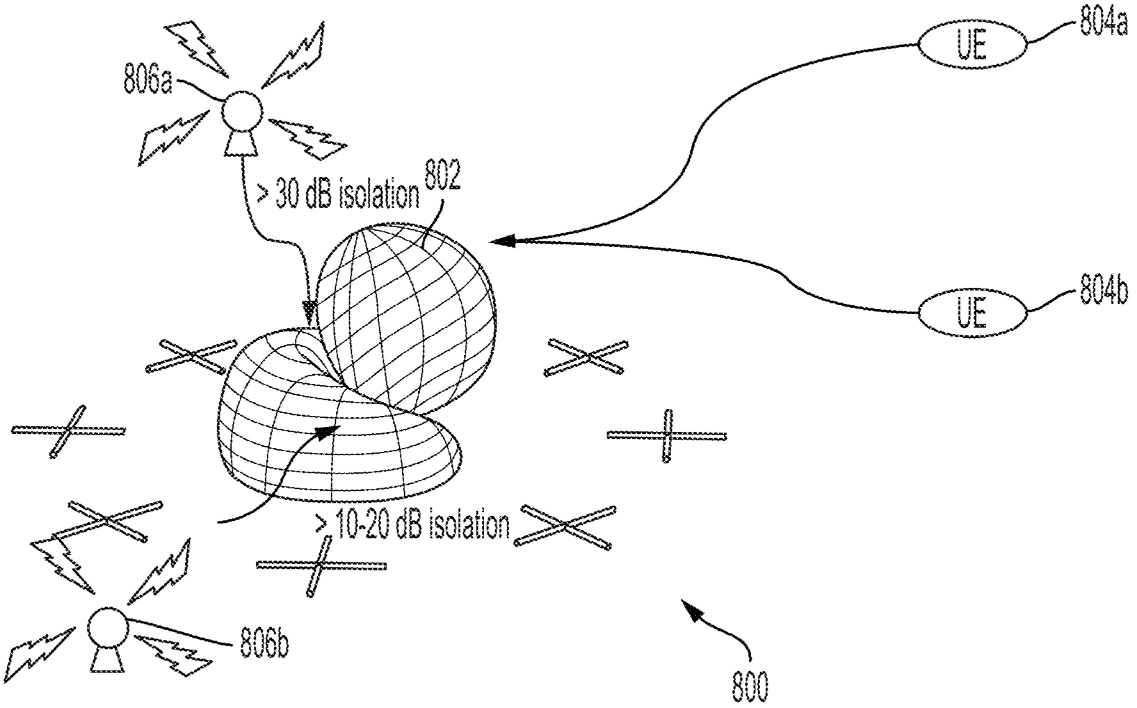
FIG. 8 shows a radiation pattern with beamforming to minimize noise and maximize signal reception, according to some embodiments.

Beamforming may also be used to isolate the system from noise or interference. FIG. 8 shows a radiation pattern with beamforming to minimize noise and maximize signal reception, according to some embodiments. FIG. 8 includes a circular array 800 having a radiation pattern 802. In the example of FIG. 8, the radiation pattern is beamformed to increase the gain in the direction of users 804*a* and 804*b*. Beamforming has also oriented the radiation pattern such that interference from noise sources 806*a* and 806*b* are directed to nulls in the radiation pattern to minimize reception from interference, such as jammers. In some embodiments, the nulls may provide at least 30 dB of isolation.

By increasing the gain of the array and/or controlling the directivity of the array, the SNR may be increased for users. Higher SNR allows a user to use smaller, more transportable user equipment and also enables a user to transmit to the hub through higher degrees of freedom.

The array may transmit and/or receive data at various data rates. For example the array may transmit data at data rates of at least 1 kbps, at least 10 kbps, at least 24 kbps, at least 48 kbps, at least 100 kbps, at least 200 kbps, or at least 500 kbps. In other embodiments, the array may transmit data at data rates of 500 kbps or less, 200 kbps or less, 100 kbps or less, 48 kbps or less, 24 kbps or less, 10 kbps or less, or 1 kbps or less. Antenna design and signal processing may be used to increase SINR, which may increase the achievable data rate. For example, signal processing may be used to increase SNR by a factor of eight in some embodiments.

Figure 9:
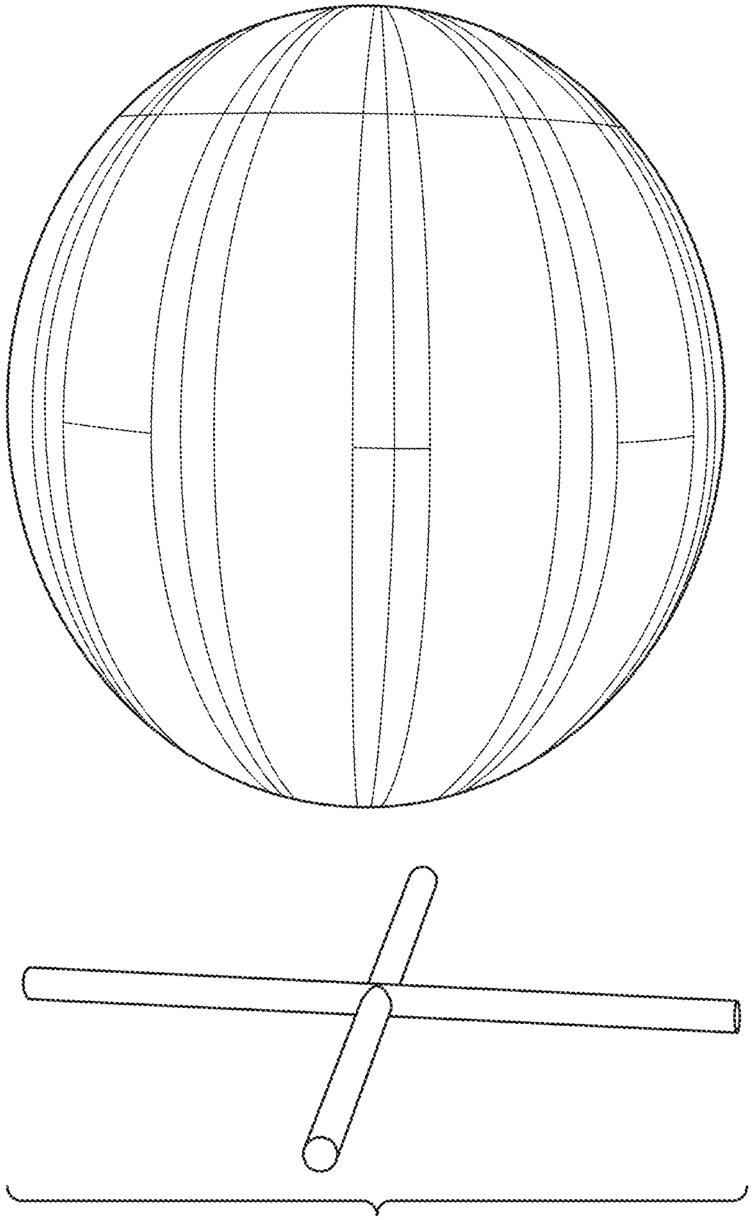
FIG. 9 shows a radiation pattern of a crossed dipole antenna at 3 MHz, according to some embodiments.

FIG. 9 shows a radiation pattern of a crossed dipole antenna at 3 MHz, according to some embodiments. In some embodiments, a circular array may comprise one or more crossed dipole antennas. In the example of FIG. 9, the radiating element of a crossed dipole has a length of 30 meters, or half wavelength at an operating frequency of 5 MHz. The crossed dipole is placed horizontally 12 meters above the ground, or 0.2λ at an operating frequency of 5 MHz. The simulated antenna is comprised of copper and has a diameter of about 1 centimeter. The simulation assumes that the dry earth relative permittivity is 10 farads per meter and the dry earth conductivity is 0.001 Siemens per meter.

Figure 10:
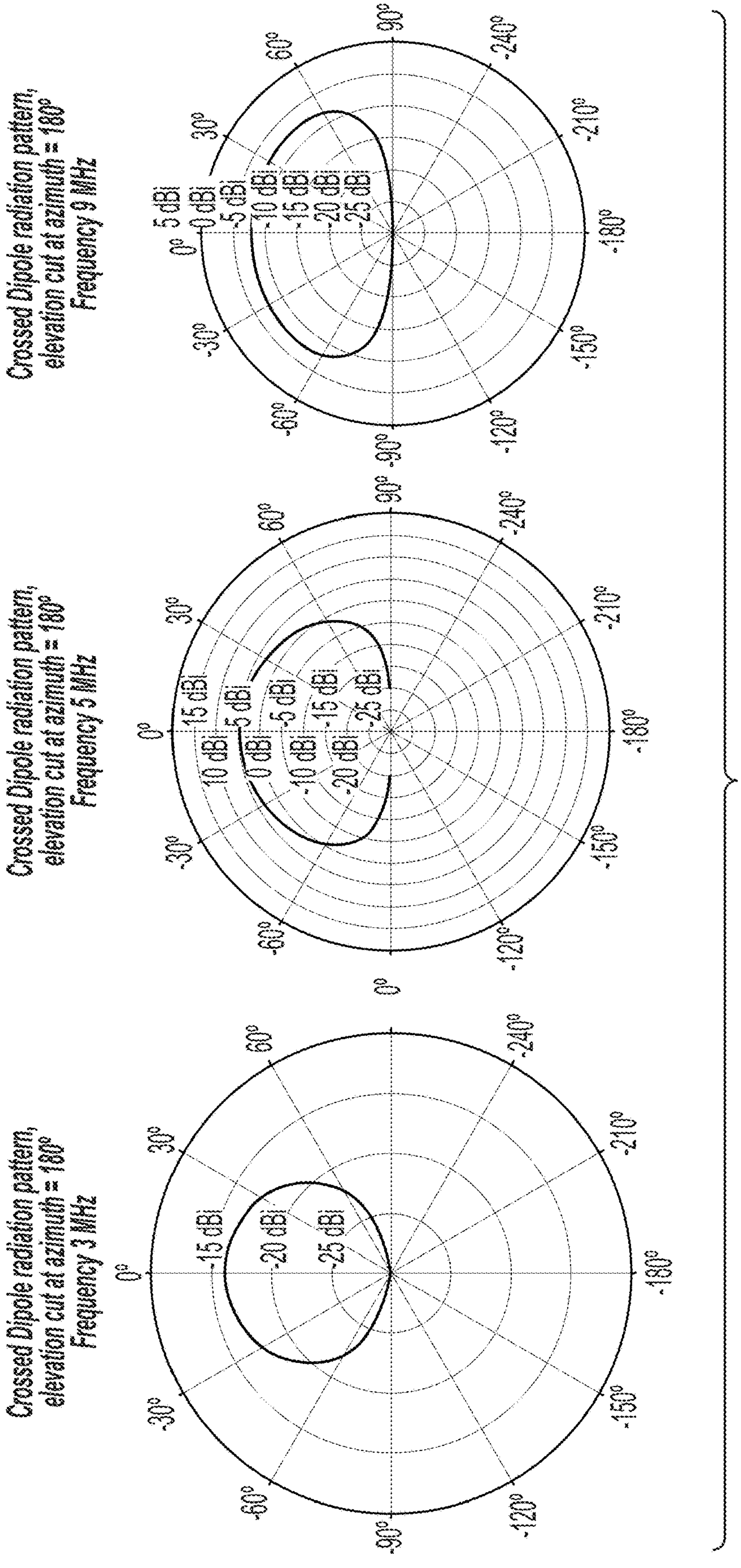
FIG. 10 shows an elevation cut of a radiation pattern of a crossed dipole antenna at various frequencies.

FIG. 10 shows an elevation cut of a radiation pattern of a crossed dipole antenna at various frequencies. As the operating frequency increases, the radiation pattern becomes more directive towards Earth. As the operating frequency decreases, the radiation pattern becomes more directive toward the sky. Thus, the radiation pattern at lower frequencies provide higher gain for high launch angles, such as greater than 30 degrees. The radiation pattern for higher frequencies provide higher gain for low launch angles, such as less than 30 degrees.

Figure 11:
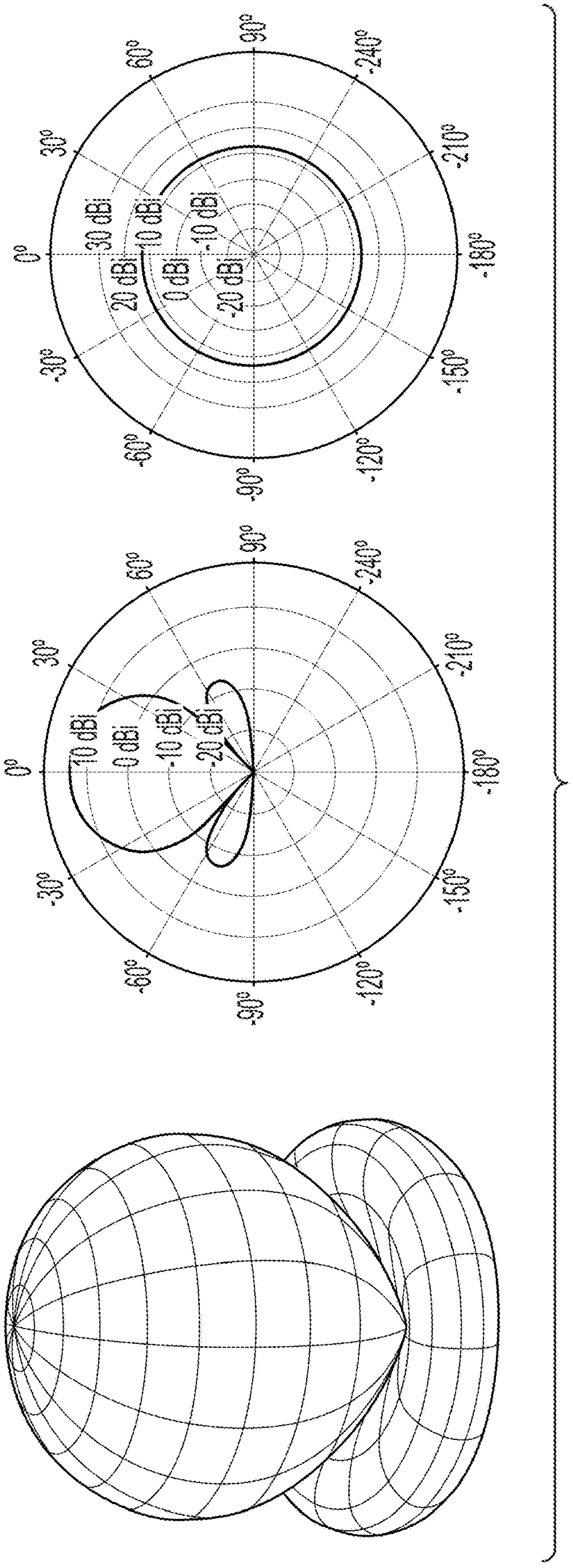
FIG. 11 shows a radiation pattern for a circular array comprising crossed dipole antennas at 5 MHz, according to some embodiments.

FIG. 11 show a radiation pattern for a circular array comprising crossed dipole antennas at 5 MHz, according to some embodiments. The radiation patterns of the individual crossed dipoles, such as shown in FIG. 9, combine to having a maximum gain at zenith and a null at approximately 50 degrees. The radiation pattern does not vary as the number of antennas in the array changes.

Figure 12:
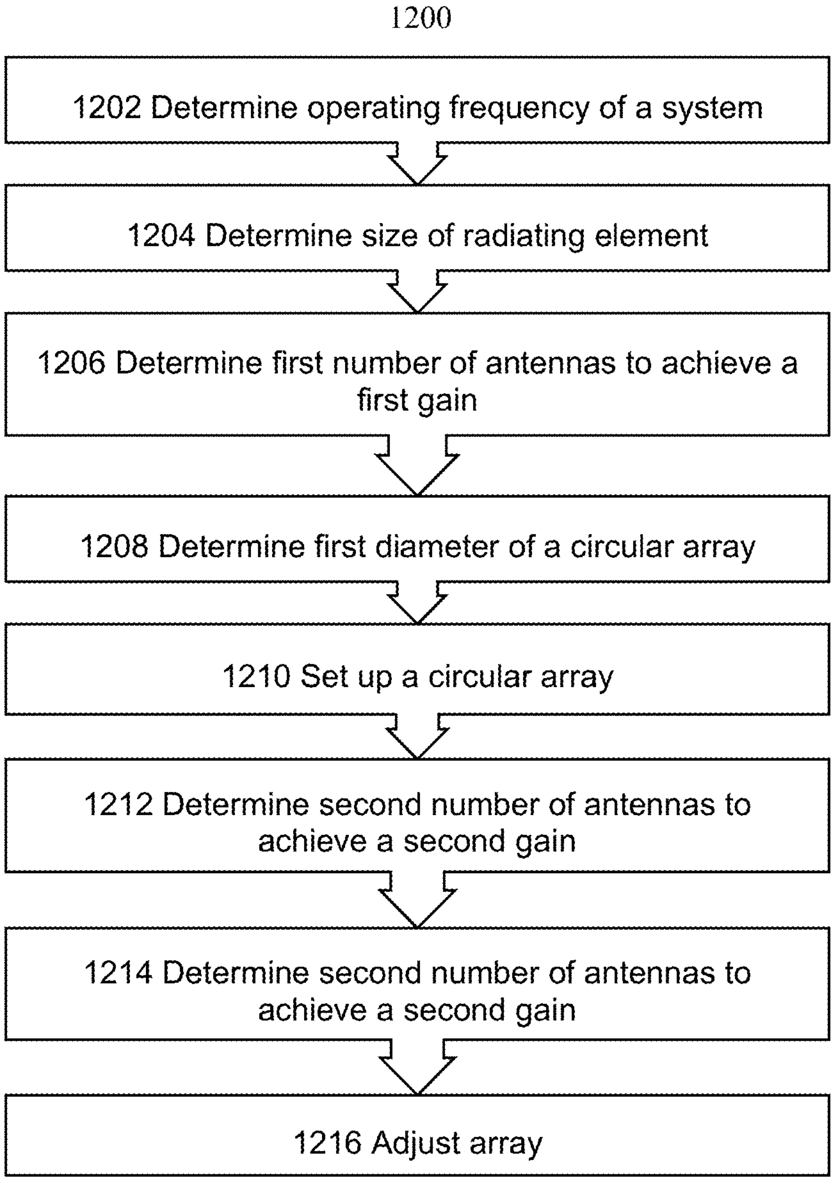
FIG. 12 illustrates a flow diagram for determining a number of antennas in a circular array, according to some embodiments.

FIG. 12 illustrates a flow diagram 1200 for determining a number of antennas in a circular array, according to some embodiments.

At step 1202, an operating frequency of an antenna system may be determined. In some embodiments, the operating frequency may be 1 kHz or less, 100 kHz or less, 1 MHz or less, 3 MHz or less, 5 MHz or less, 14 MHz or less, 30 MHz or less, 50 MHz or less, or 100 MHz or less. In other embodiments, the operating frequency may be at least 1 kHz, at least 100 kHz, at least 1 MHz, at least 3 MHz, at least 5 MHz, at least 8 MHz, at least 14 MHz, at least 30 MHz, at least 50 MHz, or at least 100 MHz.

In still further embodiments, the system may be configured to operate between 3 MHz and 8 MHz, between 3 MHz and 10 MHz, or between 3 MHz and 30 MHz.

At step 1204, a size of a radiating element of an antenna may be determined. For example, a size of a radiating element may be determined such that the antenna is transportable, such as by being mounted on a vehicle.

At step 1206, a first number of antennas necessary to achieve a first gain may be determined. In some embodiments, the number of antennas necessary to achieve a first gain may be based on the size of the radiating element of the antennas.

At step 1208, a first diameter of a circular array may be determined. In some embodiments, the first diameter may be based on the first number of antennas in the array and/or the operating frequency of the system. In some embodiments, adjacent antennas may be separated by at least half the wavelength of the operating frequency. Where the distance between adjacent elements is about half the wavelength of the operating frequency, the diameter of an array having N elements may be given by the equation:

$$D = \frac{\lambda_0}{2}\csc\left(\frac{\pi}{N-1}\right)$$

In some embodiments, the first diameter may be 5 meters or less, 15 meters or less, 50 meters or less, 100 meters or less, 500 meters or less, 1000 meters or less, or 1500 meters or less. In other embodiments, the first diameter may be at least 5 meters, at least 15 meters, at least 50 meters, at least 100 meters, at least 500 meters, at least 1000 meters, or at least 1500 meters.

At step 1210, a circular array may be set up having a first radiation pattern and a diameter of at least the first diameter. The circular array may comprise at least the first number of antennas arranged around a first circle having the first diameter.

At step 1212, a second number of antennas necessary to achieve a second gain may be determined. In some embodiments, the number of antennas necessary to achieve a second gain may be based on the size of the radiating element of the antennas. In some embodiments, the second gain may be greater than the first gain. In other embodiments, the second gain may be less than the first gain.

At step 1214, a second diameter of a circular array may be determined. In some embodiments, the second diameter may be based on the second number of antennas in the array and/or the operating frequency of the system.

In some embodiments, the second diameter may be 5 meters or less, 15 meters or less, 50 meters or less, 100 meters or less, 500 meters or less, 1000 meters or less, or 1500 meters or less. In other embodiments, the second diameter may be at least 5 meters, at least 15 meters, at least 50 meters, at least 100 meters, at least 500 meters, at least 1000 meters, or at least 1500 meters.

At step 1216, the circular array may be adjusted such that the array has a diameter of at least the second diameter and a second radiation pattern, and the circular array comprises at least the second number of antennas arranged around a second circle having at least the second diameter. In some embodiments, adjacent antennas may be separated by at least half the wavelength of the operating frequency.

In some embodiments, the first radiation pattern and the second radiation pattern may have the same directivity.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method for determining a number of antennas in an array, comprising:

determining an operating frequency of an antenna system;

determining a size of a radiating element of an antenna;

determining a first number of antennas necessary to achieve a first gain, wherein the number of antennas is based on the size of the radiating element;

determining a first diameter of a circular array, wherein the first diameter is based on the first number of antennas and the operating frequency;

setting up a circular antenna array having a first radiation pattern and a diameter of at least the first diameter, wherein the circular array comprises a first plurality of at least the first number of antennas arranged around a first circle having the first diameter, and wherein the first plurality of antennas are separated by at least half of a wavelength of the operating frequency.

2. The method of claim 1, comprising determining a second number of antennas necessary to achieve a second gain.

3. The method of claim 2, comprising determining a second diameter of the circular array, wherein the second diameter is based on the second number of antennas and the operating frequency.

4. The method of claim 3 comprising adjusting the circular array such that the array has a second radiation pattern and a diameter of at least the second diameter, wherein the circular array comprises a second plurality of at least the second number of antennas arranged around a second circle having the second diameter, and wherein the second plurality of antennas are separated by half the wavelength of the operating frequency or more.

5. The method of claim 4, wherein the first radiation pattern and the second radiation pattern have the same directivity.

6. The method of claim 4, wherein the second gain is greater than the first gain.

7. The method of claim 4, wherein the first and second diameter are 20 meters or more.

8. The method of claim 1, wherein the operating frequency is between 3 MHz and 30 MHz and the first diameter is between 5 meters and 1,500 meters.

9. The method of claim 1, wherein the operating frequency is between 3 MHz and 8 MHz and the first diameter is between 20 meters and 1,500 meters.

* * * * *